United States Patent
Xie et al.

(10) Patent No.: US 12,159,972 B2
(45) Date of Patent: Dec. 3, 2024

(54) LITHIUM METAL BATTERY ELECTROLYTE CONTAINING AROMATIC COMPOUND AS DILUENT

(71) Applicant: HUAZHONG UNIVERSITY OF SCIENCE AND TECHNOLOGY, Hubei (CN)

(72) Inventors: Jia Xie, Hubei (CN); Zhipeng Jiang, Hubei (CN); Ziqi Zeng, Hubei (CN); Zhilong Han, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 533 days.

(21) Appl. No.: 17/607,033

(22) PCT Filed: May 15, 2020

(86) PCT No.: PCT/CN2020/090590
§ 371 (c)(1),
(2) Date: Oct. 28, 2021

(87) PCT Pub. No.: WO2021/103435
PCT Pub. Date: Jun. 3, 2021

(65) Prior Publication Data
US 2022/0216521 A1      Jul. 7, 2022

(30) Foreign Application Priority Data
Nov. 28, 2019   (CN) .......................... 201911192174.1

(51) Int. Cl.
  *H01M 10/0569*   (2010.01)
  *H01M 10/0525*   (2010.01)

(52) U.S. Cl.
  CPC ... *H01M 10/0569* (2013.01); *H01M 10/0525* (2013.01); *H01M 2300/0028* (2013.01)

(58) Field of Classification Search
  CPC .................................................. H01M 10/0569
  See application file for complete search history.

(56) References Cited

U.S. PATENT DOCUMENTS

| | | | | |
|---|---|---|---|---|
| 2003/0190529 A1* | 10/2003 | Kim | ................. | H01M 10/0569 |
| | | | | 429/309 |
| 2004/0214091 A1* | 10/2004 | Lim | ................. | H01M 10/0567 |
| | | | | 429/340 |

(Continued)

FOREIGN PATENT DOCUMENTS

| | | |
|---|---|---|
| CN | 1610179 | 4/2005 |
| CN | 101371396 | 2/2009 |

(Continued)

OTHER PUBLICATIONS

Machine translation of the PCT written opinion (Year: 0000).*
(Continued)

*Primary Examiner* — Amanda C. Walke
(74) *Attorney, Agent, or Firm* — JCIP GLOBAL INC.

(57) ABSTRACT

The present invention relates to the technical field of lithium metal batteries, and relates to a lithium metal battery electrolyte containing an aromatic compound as a diluent. The electrolyte contains a lithium salt, a solvent for dissolving the lithium salt, and a diluent; the diluent is an aromatic compound, and the diluent is used for inhibiting lithium dendrites generated due to uneven deposition of a lithium metal anode in the lithium metal battery during a cycle process, and is used for inhibiting the lithium metal anode in the lithium metal battery from reacting with the electrolyte.

9 Claims, 3 Drawing Sheets

(56) References Cited

U.S. PATENT DOCUMENTS

| | | | | |
|---|---|---|---|---|
| 2005/0064294 A1* | 3/2005 | Lim | ............... | H01M 10/0525 |
| | | | | 429/328 |
| 2005/0106471 A1* | 5/2005 | Kim | ............... | H01M 10/052 |
| | | | | 429/200 |
| 2006/0147808 A1* | 7/2006 | Xiao | ............... | H01M 10/0525 |
| | | | | 429/200 |
| 2006/0160000 A1* | 7/2006 | Kim | ............... | H01M 10/0567 |
| | | | | 429/200 |
| 2007/0042267 A1* | 2/2007 | Kim | ............... | H01M 10/0569 |
| | | | | 429/231.95 |

FOREIGN PATENT DOCUMENTS

| | | | | |
|---|---|---|---|---|
| CN | 101385183 | | 3/2009 | |
| EP | 1528616 A2 * | | 5/2005 | ......... H01M 10/052 |
| KR | 2007083278 A * | | 8/2007 | |
| KR | 2018086140 A * | | 7/2018 | ........ H01M 10/0525 |

OTHER PUBLICATIONS

"International Search Report (Form PCT/ISA/210) of PCT/CN2020/090590," mailed on Sep. 1, 2020, with English translation thereof, pp. 1-4.

"Written Opinion of the International Searching Authority (Form PCT/ISA/237) of PCT/CN2020/090590," mailed on Sep. 1, 2020, pp. 1-5.

* cited by examiner

LITHIUM METAL BATTERY ELECTROLYTE CONTAINING AROMATIC COMPOUND AS DILUENT

CROSS-REFERENCE TO RELATED APPLICATION

This application is a 371 of international application of PCT application serial no. PCT/CN2020/090590, filed on May 15, 2020, which claims the priority benefit of China application no. 201911192174.1, filed on Nov. 28, 2019. The entirety of each of the above mentioned patent applications is hereby incorporated by reference herein and made a part of this specification.

BACKGROUND

Technical Field

The invention relates to the technical field of lithium metal batteries, and in particular, relates to a lithium metal battery electrolyte containing an aromatic compound as a diluent.

Description of Related Art

Metallic lithium has a higher specific capacity (3,860 mAh/g) and the lowest potential (−3.04 V compared to a standard hydrogen electrode). Metallic lithium as an anode may be used in a lithium-sulfur battery, a lithium-air battery, a lithium-intercalated cathode battery, and a lithium transition-metal oxide cathode battery etc., and is a focus in the research of high energy density secondary batteries. However, the lithium dendrites growth and the rupture of the SEI film during the cycle process of a lithium metal anode have respectively brought safety and cycling problems to the lithium metal battery. The development and commercialization of the lithium metal anode are thereby affected.

The solution to the metallic lithium anode is mainly to control the morphology of the lithium deposition and to form a relatively stable SEI film. From the above two points, Qiang Zhang et al. of Tsinghua University added polysulfide ($Li_2S_x$) to the LiTFSI salt electrolyte containing lithium nitrate to form an SEI film that strengthens the grain boundary, the transportation rate of lithium-ions was thereby increased, and a uniform deposition surface was obtained (Energy Storage Materials 2018 10: 199-205). However, this solution cannot be done once and for all, and the performance of the additive cannot be maintained after being continuously consumed. Ji-Guang Zhang et al. of the Pacific Northwest National Laboratory in the United States developed a local high-concentration electrolyte. By adding polyfluoroether to dilute the electrolyte with high concentration of lithium salt, the solvation structure in the electrolyte was improved to accelerate the lithium-ion transportation, and the lithium metal deposition was uniformized to inhibit the growth of dendrites on the lithium metal surface (Adv Mater 2018 30(21): e1706102). However, due to the high costs of polyfluoroether, this type of electrolyte is difficult to be used in actual production. Therefore, development of a new and low-cost diluent to solve the problem caused by the lithium metal anode is an important issue.

SUMMARY

The invention solves a lithium dendritic phenomenon caused by uneven deposition of a lithium metal anode during a cycle process, a phenomenon in which dead lithium produced by reaction between the lithium metal anode and an electrolyte reduces the cycle performance, and especially a problem of the high costs of a conventional electrolyte. The invention adopts a lithium metal battery electrolyte containing an aromatic compound as a diluent, so that a solvation structure of a lithium salt in the electrolyte is improved to accelerate lithium-ion transportation, a degree of uneven local current density on a surface of lithium metal is reduced, and lithium metal deposition is uniformized, so that growth of dendrites on the surface of the lithium metal is inhibited. Moreover, the electrolyte has high conductivity, low viscosity, and good wettability, Coulombic efficiency of the lithium metal battery may be effectively improved, and cycle life of the lithium metal battery is greatly prolonged.

According to the purpose of the invention, the invention provides a lithium metal battery electrolyte containing an aromatic compound as a diluent, and the electrolyte includes a lithium salt, a solvent for dissolving the lithium salt, and a diluent. The diluent is an aromatic compound. The diluent is used for changing a solvation effect of the electrolyte, adding stable free solvent molecules to inhibit lithium dendrites generated due to uneven deposition of a lithium metal anode in a lithium metal battery during a cycle process, and to inhibit the lithium metal anode in the lithium metal battery from reacting with the electrolyte.

Preferably, the aromatic compound is at least one of benzene, halogenated benzene, halogenated benzene homologue, halogenated benzene isomer, alkane benzene, alkane benzene homologue, and alkane benzene isomer.

Preferably, the halogenated benzene is fluorobenzene, methylfluorobenzene, chlorobenzene, bromobenzene, difluorobenzene, trifluorobenzene, tetrafluorobenzene, pentafluorobenzene, or hexafluorobenzene; the halogenated benzene isomer is a difluorobenzene isomer, a trifluorobenzene isomer, a tetrafluorobenzene isomer, or a methylfluorobenzene isomer; and the alkane benzene is toluene or ethylbenzene.

Preferably, the lithium salt is at least one of lithium hexafluorophosphate, lithium perchlorate, lithium bisfluorosulfonimide, lithium bistrifluorosulfonimide, lithium tetrafluoroborate, and lithium hexafluoroarsenate.

Preferably, a lithium salt concentration in the electrolyte is 0.5 mol/L to 5 mol/L.

Preferably, the solvent for dissolving the lithium salt is at least one of an ester solvent and an ether solvent.

Preferably, the ester solvent is ethylene carbonate, dimethyl carbonate, diethyl carbonate, fluorocarbonate, or propylene carbonate, and the ether solvent is ethylene glycol dimethyl ether, diethylene glycol dimethyl ether, tetraethylene glycol dimethyl ether, tetrahydrofuran, or 1,3-dioxolane.

Preferably, a ratio of an amount of the solvent for dissolving the lithium salt to an amount of the lithium salt is (1-20):1.

Preferably, a ratio of an amount of the aromatic compound to an amount of the lithium salt is (1-20):1.

Preferably, an anode of the lithium metal battery is lithium metal, a cathode of the lithium metal battery is lithium iron phosphate, lithium cobalt oxide, lithium titanate, lithium manganate, nickel cobalt manganese ternary, nickel cobalt aluminum ternary, sulfur, oxygen, carbon dioxide, or air; and a separator of the lithium metal battery is a polypropylene separator, a polyethylene separator, a composite separator of polypropylene and polyethylene, an $Al_2O_3$ coated separator, a glass fiber separator, a polytetrafluoroethylene separator, a cellulose separator, or an aramid separator.

In general, the above technical solutions provided by the invention have the following technical advantages compared to the related art.

(1) At present, because the lithium metal anodes still exhibit unstable chemical properties, poor cycle performance, and low capacity retention, it is difficult for lithium metal batteries to be mass-produced and commercialized. Therefore, the invention provides a lithium metal battery electrolyte containing an aromatic compound as a diluent. In the electrolyte, an aromatic diluent is added to dilute the high-concentration lithium salt electrolyte, so that the solvation effect of the electrolyte is changed, stable free solvent molecules are obviously increased to accelerate the lithium-ion transportation, the degree of uneven local current density on the surface of lithium metal is reduced, and the lithium metal deposition is uniformized, thereby growth of dendrites on the surface of the lithium metal is inhibited. Moreover, the electrolyte has high conductivity, low viscosity, and good wettability, the Coulombic efficiency of the lithium metal battery may be effectively improved, and the cycle life of the lithium metal battery is greatly prolonged.

(2) In the invention, the preferred diluent is fluorobenzene, which may be electrochemically reduced to produce lithium fluoride which is beneficial to the stability of lithium metal when being added to the electrolyte as a diluent in addition to the function provided in point (1). More importantly, compared with other widely used polyfluoroether diluents, the aromatic diluent may form an organic aromatic lithium compound (e.g., phenyl lithium) during the electro-reduction process. The resulting lithium compound can promote the complete decomposition of the lithium salt, and a dense and stable protective layer may thereby be formed on the surface of the lithium foil.

(3) Compared with other widely used polyfluoroethers diluents, the aromatic compound diluent used in the electrolyte of the invention has a smaller density and a smaller mass under the same volume. Therefore, the use of such diluent may further increase the energy density of lithium metal batteries. Because aromatic compounds have a wide range of dielectric constants (2-20), they are suitable for various lithium battery solvents. Whether it is a low-polarity ether (ethylene glycol dimethyl ether, etc.) solvent or a high-polarity ester solvent (fluorocarbonate, etc.), aromatic compounds may be well miscible, thus acting as a diluent. Further, the aromatic compound diluent is a conventional industrial raw material with a wide range of sources and low prices, which greatly reduces the cost of electrolyte, may be applied on a large scale, and has high commercial value.

(4) Although the electrolyte containing a high concentration of lithium salt may improve the performance of the lithium metal anode, it has the disadvantages of low conductivity, high viscosity, and high costs. Therefore, another component that is compatible with the solvent but cannot be coordinated with the lithium salt may be added to the high-concentration electrolyte (that is, the original solvation structure of the lithium salt is not changed). In this way, the viscosity and costs of the high-concentration electrolyte are significantly reduced on a macroscopic scale. On the microscopic scale, the solvation structure of the lithium salt and the original solvent molecules are not changed, and thus, the performance advantages of the high-concentration electrolyte are retained, and the shortcomings are addressed. Therefore, in the invention, the diluent featuring low costs is selected, and since most lithium salts (e.g., lithium hexafluorophosphate, lithium difluorosulfonate, etc.) are insoluble in conventional aromatic compounds, this type of diluent may be applied to a variety of lithium salt systems.

(5) In the invention, preferably, the ratio of the amount of the solvent for dissolving the lithium salt to the amount of the lithium salt is (1-20):1, and the ratio of the amount of the aromatic compound to the amount of the lithium salt is (1-20):1. The electrolyte with these ratios not only greatly improves the performance of the lithium metal anode, but also has the advantages of low viscosity, low density, and low costs.

(6) The electrolyte prepared by the invention may be used in the next-generation lithium metal batteries. In the lithium metal battery, the anode is metal lithium, and the cathode is produced by lithium iron phosphate, lithium cobalt oxide, lithium titanate, lithium manganate, nickel cobalt manganese ternary, nickel cobalt aluminum ternary, sulfur, oxygen, carbon dioxide, or air. Moreover, the electrolyte requires low production costs and may be applied on a large scale.

DESCRIPTION OF THE EMBODIMENTS

To better illustrate the goal, technical solutions, and advantages of the invention, the following embodiments accompanied with drawings are provided so that the invention are further described in detail. It should be understood that the specific embodiments described herein serve to explain the invention merely and are not used to limit the invention. In addition, the technical features involved in the various embodiments of the invention described below can be combined with each other as long as the technical features do not conflict with each other.

A lithium metal battery electrolyte containing an aromatic compound as a diluent is provided, and the electrolyte includes a lithium salt, a solvent for dissolving the lithium salt, and a diluent. The diluent is an aromatic compound. The diluent is used for changing a solvation effect of the electrolyte, adding stable free solvent molecules to inhibit lithium dendrites generated due to uneven deposition of a lithium metal anode in a lithium metal battery during a cycle process, and inhibit the lithium metal anode in the lithium metal battery from reacting with the electrolyte.

A lithium salt concentration in the electrolyte is preferably 0.5 mol/L to 5 mol/L, more preferably 1 mol/L. A ratio of an amount of the solvent for dissolving the lithium salt to an amount of the lithium salt is preferably (1-20):1, more preferably 2:1. A ratio of an amount of the aromatic compound to an amount of the lithium salt is preferably (1-20):1, more preferably 5:1.

Example 1

Figure 1:
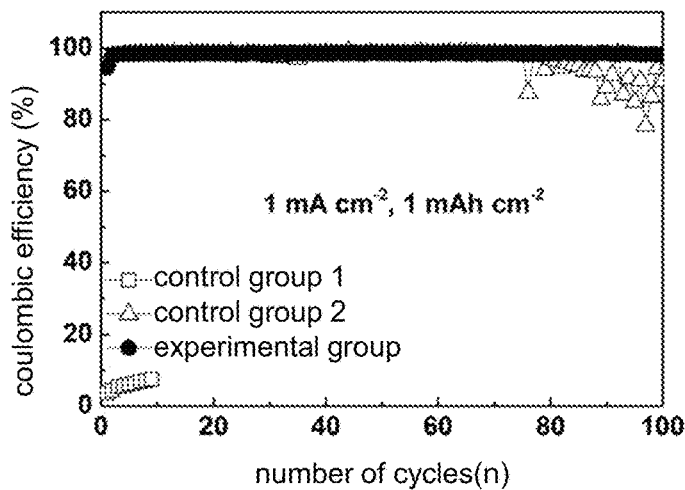
FIG. 1 is test data of Coulombic efficiency of an aromatic compound diluted in an ester electrolyte according to Example 1 of the invention.

Lithium bisfluorosulfonimide, dimethyl carbonate, and toluene were mixed into a homogeneous solution respectively at the molar ratios of 1:10:0, 1:2:0, and 1:2:4 (i.e., control group 1, control group 2, and experimental group in turn). The above electrolyte, a lithium foil, a copper foil, and a separator were used to assemble a lithium-copper half cell, and a Coulombic efficiency test was performed at a current density of 1 mA cm$^{-2}$. As shown in FIG. 1, in the experimental group where toluene was added as the diluent in the electrolyte, the battery test was stable for more than 100 cycles, and the average Coulombic efficiency was higher than 99.3%, while the control groups were not stable.

Example 2

The lithium salt used was lithium hexafluorophosphate, and the rest were the same as in Example 1.

Example 3

Figure 2:
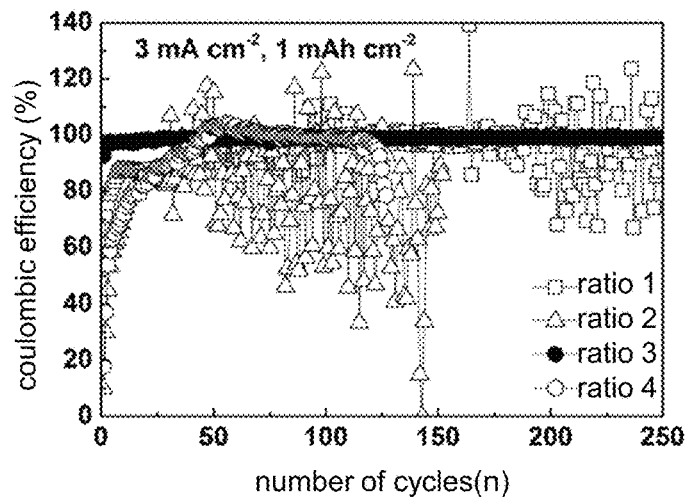
FIG. 2 is test data of the Coulombic efficiency of different ratios of aromatic compounds diluted in an ether electrolyte according to Example 3 of the invention.

Lithium bisfluorosulfonimide, ethylene glycol dimethyl ether, and fluorobenzene were mixed into a homogeneous solution respectively at the molar ratios of 1:2:0, 1:2:2, 1:2:4, and 1:2:6 (i.e., ratio 1, ratio 2, ratio 3, and ratio 4 in turn). The above electrolyte, a lithium foil, a copper foil, and a separator were used to assemble a lithium-copper half cell together, and a Coulombic efficiency test was performed at a current density of 3 mA cm$^{-2}$. As shown in FIG. 2, in the experimental group where fluorobenzene was added as the diluent in the electrolyte with the ratio of 1:2:4 of ratio 3, the cell test was stable for more than 250 cycles, and the average Coulombic efficiency was higher than 99.4%. The remaining ratios of electrolytes all showed low Coulombic efficiency and short cycle life.

Example 4

The lithium salt used was lithium bistrifluorosulfonimide, and the rest were the same as in Example 3.

Example 5

Figure 3:
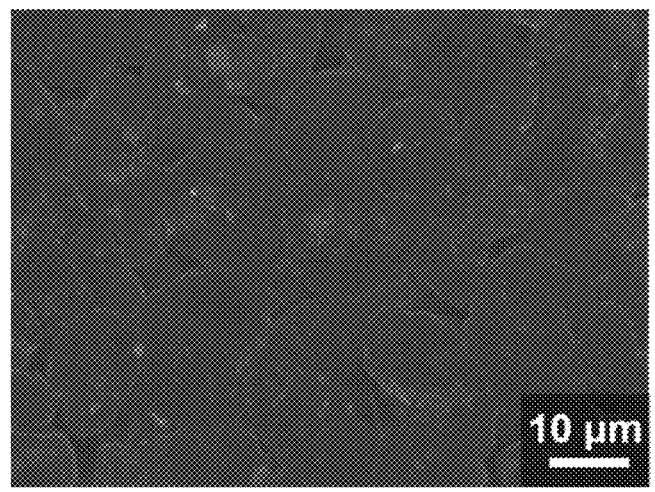
FIG. 3 shows lithium deposition morphology of the aromatic compound diluted in the ether electrolyte according to Example 5 of the invention.

Lithium bisfluorosulfonimide, ethylene glycol dimethyl ether, and fluorobenzene were mixed into a homogeneous solution at the molar ratio of 1:2:4. The above electrolyte, a lithium foil, a copper foil, and a separator were used to assemble a lithium-copper half cell together. Lithium of 5 mAh cm$^{-2}$ was deposited on the surface of the copper foil, and the copper foil was taken out to photograph the morphology of the lithium deposition. As shown in FIG. 3, the surface of the lithium deposited using this electrolyte was uniform and dense.

Example 6

The solvent used was 1,3-dioxolane, and the rest were the same as in Example 5.

Example 7

Figure 4:
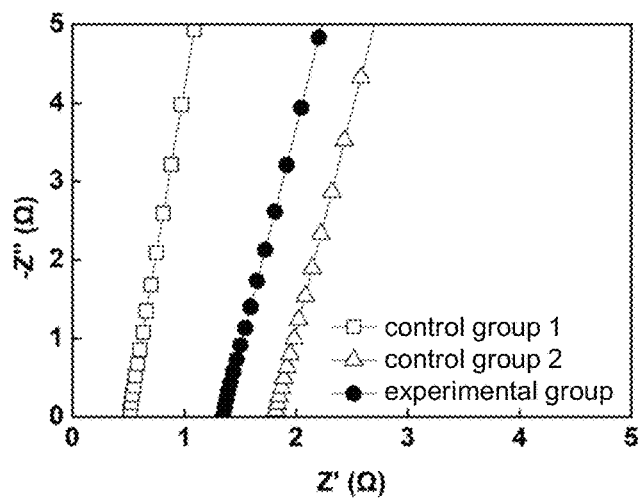
FIG. 4 is conductivity test data of the aromatic compound diluted in the ether electrolyte according to Example 7 of the invention.

Lithium bisfluorosulfonimide, ethylene glycol dimethyl ether, and fluorobenzene were mixed into a homogeneous solution respectively at the molar ratios of 1:10:0, 1:2:0, and 1:2:4 (i.e., control group 1, control group 2 and experimental group in turn). The above electrolyte, a stainless-steel foil, and a separator were used to assemble a battery together, and the conductivities of different electrolytes were compared by measuring their impedances at room temperature. As shown in FIG. 4, in the experimental group where fluorobenzene was added as the diluent in the electrolyte, its conductivity was significantly higher than that of the control group 2.

Example 8

The solvent used was dimethyl carbonate, and the rest were the same as in Example 7.

Example 9

Figure 5:
FIG. 5 is wettability test data of the aromatic compound diluted in the ether electrolyte according to Example 9 of the invention.

Lithium bisfluorosulfonimide, ethylene glycol dimethyl ether, and fluorobenzene were mixed into a homogeneous solution respectively at the molar ratios of 1:10:0, 1:2:0, and 1:2:4 (i.e., control group 1, control group 2 and experimental group in turn). Each of the above electrolytes was used to measure the contact angle between the electrolyte and the separator to compare the wettabilities of different electrolytes. As shown in FIG. 5, in the experimental group where fluorobenzene was added as the diluent in the electrolyte, the minimum contact angle was 39.2°, which was much lower than those of the control groups 1 and 2.

Example 10

The solvent used was diethyl carbonate, and the rest were the same as in Example 9.

Example 11

Figure 6:
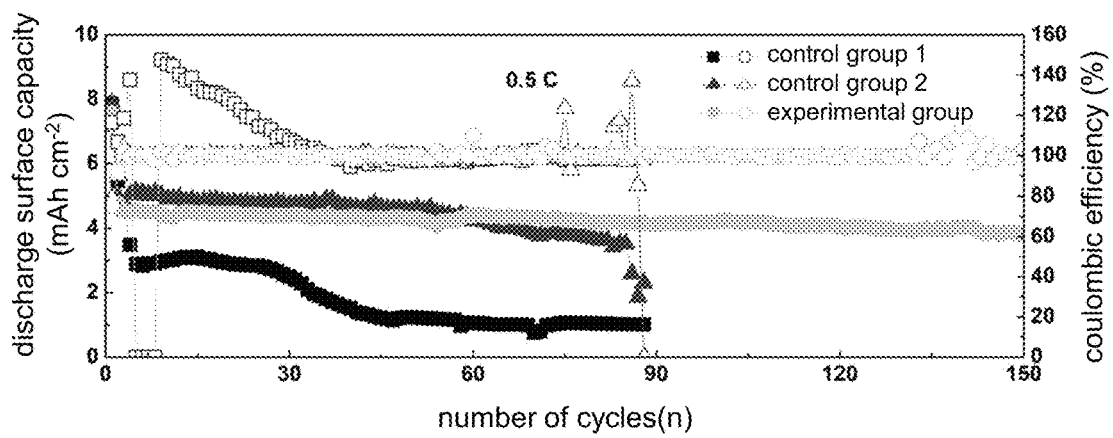
FIG. 6 is a graph of a cycle capacity of an assembled lithium-sulfur full cell in which the aromatic compound is diluted in the ether electrolyte according to Example 11 of the invention.

Lithium bisfluorosulfonimide, ethylene glycol dimethyl ether, and fluorobenzene were mixed into a homogeneous solution respectively at the molar ratios of 1:10:0, 1:2:0, and 1:2:4 (i.e., control group 1, control group 2 and experimental group in turn). A lithium-sulfur full cell was assembled using the above electrolyte, a lithium foil, a high-loading sulfur cathode, and a separator, and the cycle test was performed at a rate of 0.5 C. As shown in FIG. 6, in the experimental group where fluorobenzene was added as the diluent in the electrolyte, the cycle stability exceeded 150 cycles, and the capacity performance exceeded 4 mAh cm$^{-2}$, which were much better than those of the control groups 1 and 2.

Example 12

The diluent used was p-methylfluorobenzene, and the rest were the same as in Example 11.

Example 13

Figure 7:
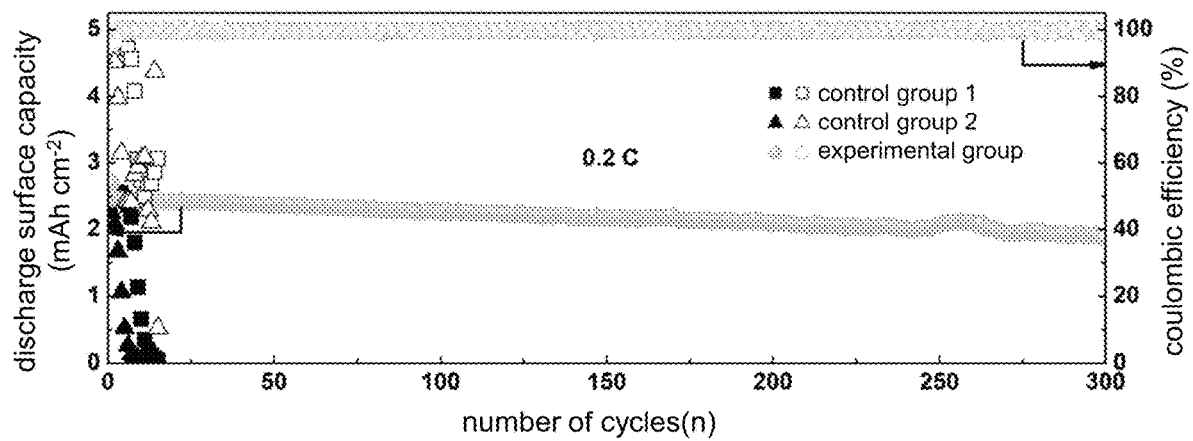
FIG. 7 is a graph of the cycle capacity of an assembled lithium-lithium iron phosphate full cell in which the aromatic compound is diluted in the ether electrolyte according to Example 13 of the invention.

Lithium bisfluorosulfonimide, ethylene glycol dimethyl ether, and fluorobenzene were mixed into a homogeneous solution respectively at the molar ratios of 1:10:0, 1:2:0, and 1:2:4 (i.e., control group 1, control group 2 and experimental group in turn). A lithium-lithium iron phosphate full cell was assembled using the above electrolyte, a lithium foil, a high-loading lithium iron phosphate cathode, and a separator, and the cycle test was performed at a rate of 0.2 C. As shown in FIG. 7, in the experimental group where fluorobenzene was added as the diluent in the electrolyte, the cycle stability exceeded 300 cycles, and the capacity performance exceeded 2.5 mAh cm$^{-2}$, which were much better than those of the control groups 1 and 2.

Example 14

The diluent used was o-dichlorobenzene, and the rest were the same as in Example 13.

Example 15

Figure 8:
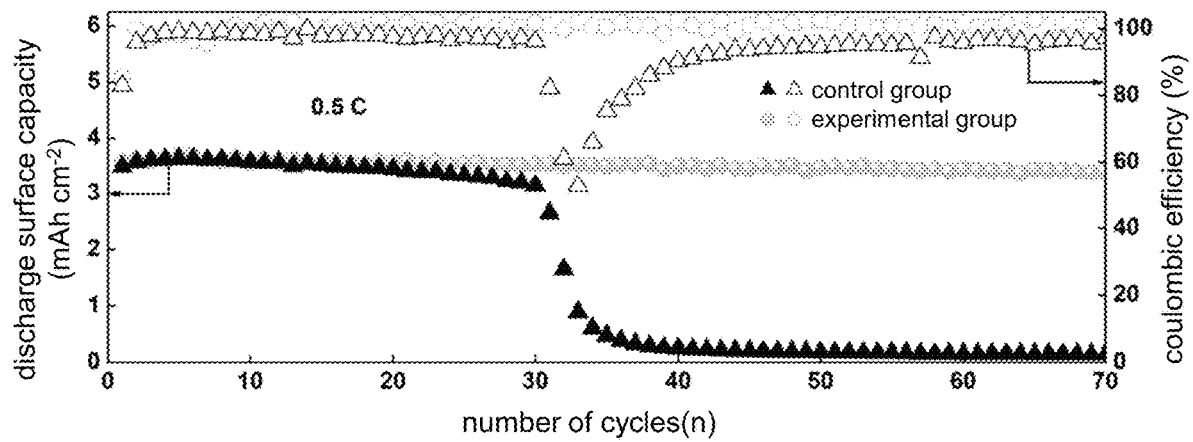
FIG. 8 is a graph of the cycle capacity of an assembled lithium-nickel cobalt manganese ternary full cell in which the aromatic compound is diluted in the ether electrolyte according to Example 15 of the invention.

Lithium bisfluorosulfonimide, ethylene glycol dimethyl ether, and fluorobenzene were mixed into a homogeneous solution respectively at the molar ratios of 1:2:0 and 1:2:4 (i.e., the control group and the experimental group in turn). A lithium-Ni-rich layered oxides full cell was assembled using the above electrolyte, a lithium foil, a high-loading nickel cobalt manganese ternary cathode, and a separator, and the cycle test was performed at a rate of 0.5 C. As shown in FIG. 8, in the experimental group where fluorobenzene was added as the diluent in the electrolyte, the cycle stability exceeded 80 cycles, and the capacity performance exceeded 3 mAh cm$^{-2}$, which were much better than that of the control group.

A person having ordinary skill in the art should be able to easily understand that the above description is only preferred embodiments of the invention and is not intended to limit the invention. Any modifications, equivalent replacements, and modifications made without departing from the spirit and principles of the invention should fall within the protection scope of the invention.

What is claimed is:

1. A lithium metal battery electrolyte containing an aromatic compound as a diluent, wherein the electrolyte comprises a lithium salt, a solvent for dissolving the lithium salt, and a diluent, the diluent is an aromatic compound, the diluent is used for changing an solvation effect of the electrolyte, adding stable free solvent molecules to inhibit lithium dendrites generated due to uneven deposition of a lithium metal anode in a lithium metal battery during a cycle process, and inhibit the lithium metal anode in the lithium metal battery from reacting with the electrolyte, wherein a ratio of an amount of the aromatic compound to an amount of the lithium salt is (1-5):1.

2. The lithium metal battery electrolyte containing the aromatic compound as the diluent according to claim 1, wherein the aromatic compound is at least one of benzene, halogenated benzene, halogenated benzene homologue, halogenated benzene isomer, alkane benzene, alkane benzene homologue, and alkane benzene isomer.

3. The lithium metal battery electrolyte containing the aromatic compound as the diluent according to claim 2, wherein the halogenated benzene is fluorobenzene, methylfluorobenzene, chlorobenzene, bromobenzene, difluorobenzene, trifluorobenzene, tetrafluorobenzene, pentafluorobenzene, or hexafluorobenzene; the halogenated benzene isomer is a difluorobenzene isomer, a trifluorobenzene isomer, a tetrafluorobenzene isomer, or a methylfluorobenzene isomer; and the alkane benzene is toluene or ethylbenzene.

4. The lithium metal battery electrolyte containing the aromatic compound as the diluent according to claim 1, wherein the lithium salt is at least one of lithium hexafluorophosphate, lithium perchlorate, lithium bisfluorosulfonimide, lithium bistrifluorosulfonimide, lithium tetrafluoroborate, and lithium hexafluoroarsenate.

5. The lithium metal battery electrolyte containing the aromatic compound as the diluent according to claim 1, wherein a lithium salt concentration in the electrolyte is 0.5 mol/L to 5 mol/L.

6. The lithium metal battery electrolyte containing the aromatic compound as the diluent according to claim 1, wherein the solvent for dissolving the lithium salt is at least one of an ester solvent and an ether solvent.

7. The lithium metal battery electrolyte containing the aromatic compound as the diluent according to claim 6, wherein the ester solvent is ethylene carbonate, dimethyl carbonate, diethyl carbonate, fluorocarbonate, or propylene carbonate, and the ether solvent is ethylene glycol dimethyl ether, diethylene glycol dimethyl ether, tetraethylene glycol dimethyl ether, tetrahydrofuran, or 1,3-dioxolane.

8. A ratio of an amount of an amount of the solvent for dissolving the lithium salt to an amount if the lithium salt in (1-20):1.

9. A lithium metal battery, lithium metal battery electrolyte containing the aromatic compound as the diluent according to claim 1, an anode, a cathode and a separator, wherein the anode of the lithium metal battery is lithium metal, a cathode of the lithium metal battery is lithium iron phosphate, lithium cobalt oxide, lithium titanate, lithium manganate, nickel cobalt manganese ternary, nickel cobalt aluminum ternary, sulfur, oxygen, carbon dioxide, or air; and a separator of the lithium metal battery is a polypropylene separator, a polyethylene separator, a composite separator of polypropylene and polyethylene, an Al$_2$O$_3$ coated separator, a glass fiber separator, a polytetrafluoroethylene separator, a cellulose separator, or an aramid separator.

* * * * *